(12) United States Patent        (10) Patent No.:     US 7,231,918 B2
     Sato                         (45) Date of Patent:     Jun. 19, 2007

(54) FOOD FRYER

(76) Inventor: Tadayoshi Sato, 32-13, Machiya 4-chome, Arakawa-ku, Tokyo (JP)

( * ) Notice: Subject to any disclaimer, the term of this patent is extended or adjusted under 35 U.S.C. 154(b) by 163 days.

(21) Appl. No.: 10/524,862

(22) PCT Filed: Sep. 9, 2003

(86) PCT No.: PCT/JP03/11499

§ 371 (c)(1),
(2), (4) Date: Feb. 15, 2005

(87) PCT Pub. No.: WO2004/023955

PCT Pub. Date: Mar. 25, 2004

(65) Prior Publication Data

US 2005/0252506 A1    Nov. 17, 2005

(30) Foreign Application Priority Data

Sep. 10, 2002    (JP)    .............................. 2002-263817

(51) Int. Cl.
*A47J 27/02*    (2006.01)
(52) U.S. Cl. ................................ 126/383.1; 126/291.1; 99/403
(58) Field of Classification Search ............. 126/291.1, 126/383.1, 373.1; 99/403, 408
See application file for complete search history.

(56) References Cited

U.S. PATENT DOCUMENTS 4,580,549 A * 4/1986 Sato ......................... 126/391.1
5,632,266 A * 5/1997 Sato ......................... 126/391.1
6,131,564 A * 10/2000 Song ........................ 126/391.1

* cited by examiner

*Primary Examiner*—Alfred Basichas
(74) *Attorney, Agent, or Firm*—Lucas & Mercanti, LLP

(57) ABSTRACT

A food fryer allowing a fried food tank to be safely and efficiently cleaned, wherein an opening part (5a) is formed in the side upper part of an oil storage tank (5) so that an upper end part (5c) covers a lower end part (5b) a cock (5d) is installed at the bottom part of the tank, the opening part (5a) is positioned near a boundary between an oil tank area (1) and a water tank area (2), a cover part is not provided for the opening part, after a food frying operation is completed, first oil in the oil tank area (1) is stored in the oil storage tank (5) through the opening part (5a) by the opening and closing operation of the cock (5d) and then a cock (11) is opened to drain the oil from those portions other than the oil storage tank of the fried food tank (B), and the tank is cleaned, and when the next frying operation is started, the oil in the oil storage tank (5) is moved to the oil tank area (1) due to a difference in gravity between the oil and water by merely feeding the water into the fried food tank (B).

4 Claims, 8 Drawing Sheets

FOOD FRYER

TECHNOLOGY FIELD (FIELD OF THE INVENTION)

This invention relates to a food fryer having a frying food tank which comprises a water layer area (a water tank area) and an oil layer area (an oil tank area) there on, in which bits of fried batter are coming down to the water layer area through the oil layer area, especially having an oil storage tank formed at a predetermined position of the water layer area.

BACKGROUND ART (BACKGROUND OF THE INVENTION)

FIG. 7 shows an external view structure of a conventional food fryer, and FIG. 8 shows a sectional view of an oil layer area and a water layer area in the conventional food fryer:

1 is the oil layer area for storing food frying oil; 2 is the water layer area; 3 is a heat source such as a heating burner; 4 is an air cooling tube formed by a means such as welding on the outer wall of the oil layer area 1; 10 is bits of fried batter; 11 is a water discharge cock; 12 is a net; 14 is an oil discharge cock; 15 is an adjusting wheel or a roller for adjusting a balance of the food fryer on a floor surface; 16 is an air outlet; 17 is a thermostat for controlling the heat source 3.

Now, oil and water in the food fryer are respectively separated into the oil layer area 1 and the water layer area 2 due to the difference in specific gravity thereof, where the oil is heated by the heat source 3 to fry meat, fish, vegetables, etc.

The cooling means such as the air cooling tube 4 provided below the heat source 3 insulates thermal conduction caused through the heated oil at a high temperature and by bits of fried batter settled down in the water during frying work so as to control oxidation of the oil and an increase of the water temperature, furthermore to avoid steam bubbles on the oil surface, which may bring difficulties in frying operation.

According to the conventional food fryer as described above, the temperature of the oil therein is usually heated up about 200 □ during the frying operation. And we must hence cool down the oil prior to cleaning the food fryer after the frying work. Furthermore, it is necessary to store the oil in a separate container and then to put it back to the food fryer, if the same oil is to be used repeatedly. In this way, it is not easy to handle the conventional food fryer.

In order to solve the problem of displacing the oil at this food fryer cleaning as described above, in U.S. Pat. No. 5,632,266 the inventor of this application disclosed a food fryer having an oil storage tank provided with each cock at its upper position and its lower position.

A preparation step in the above U.S. Patent for cleaning the oil layer area and the water layer area out the oil storage tank of the food fryer is explained hereafter as one example. It is optional whether water is to be put into the oil storage tank prior to frying anything or not: in this example the oil storage tank of the food fryer is filled with water by user's operation of closing the lower cock and simultaneously opening the upper cock, and closing the upper cock thereafter.

The preparation steps for cleaning are as follows.

(1) first, opening the lower cock of the oil storage tank to discharge water therein so as to being empty the tank and then closing the lower cock, (2) second, opening the upper cock of the oil storage tank to fully move oil in the oil layer area to this tank, thereafter closing the upper cock, (3) finally, opening a water discharge cock formed at the lowest end of the water layer area to drain water in the water layer area out.

The food fryer after this preparation is put in steady state: the oil storage tank contains the oil, with both the upper cock and the lower cock closed; the oil layer area and the water layer area except the oil storage tank are in empty and these areas are in space coupled to outside of the food fryer through the water discharge cock; thereby capable of cleaning both the layers outside the oil storage tank.

After the layers are cleaned, the water discharge cock is to be closed and the upper cock of the oil storage tank is to be opened, where the oil in the oil storage would flow out by merely pouring water into the food fryer due to a difference in gravity between oil and water. This state is just ready for another food frying work.

The food fryer disclosed in U.S. Pat. No. 5,632,266 is good in use for improving the efficiency of the food frying operation.

And this food fryer has room for further improvement in product cost, assembling labor and handling performance of it because the oil storage tank comprises two cocks, the upper cock and the lower clock.

The object according to the invention is to reduce the cost and the labor for making the food fryer, and to improve frying and cleaning work by using an oil storage tank with an opening instead of the conventional upper cock, where an upper part of the opening is over its lower part and a lower cock of the oil storage tank is formed same as conventional.

DISCLOSURE OF THE INVENTION (SUMMARY OF THE INVENTION)

The food fryer of this invention has the oil storage tank provided with the opening for inflow and outflow of the oil, and with the lower cock for draining out water in the storage tank and filling it with used-oil at the previous frying work, the upper part of which opening overhangs its lower part.

The oil storage tank may be made in any shape such as a cylinder-like, a cubic-like, a cube-like, a sphere-like or a rugby ball-like (an ellipse in section) of vertically or horizontally long. The inside of the oil storage tank is always coupled to inner space of the frying food tank through the opening. When the lower cock of the oil storage tank is opened, the inside of the oil storage tank is also coupled to the outside of the fryer.

The opening may be formed on any upper place of the oil storage tank, preferably on the upper side wall.

In the food fryer according to the invention, when the lower cock of the oil storage tank is opened after having fried for example meat, fish or vegetables, the water in the oil storage is out drained through the lower cock, following which the oil heated at a high temperature flows into the oil storage tank from the oil layer area through the opening. After a certain time, closing the lower cock allows the oil storage tank to be filled with the used oil. And the water discharge cock of the water layer area is opened.

In this situation, cleaning work for inside of the food fryer, which is the oil layer area and the water layer area outside the oil storage tank, can commence efficiently, safely and immediately without time elapse for cooling of the used oil.

After cleaning up the food fryer and closing the water discharge cock of the water layer area, water is newly poured into the food fryer. The water increases in the water layer area of the food fryer and eventually flows into the oil storage tank from its opening, and thereby the oil in the oil storage tank accordingly moves up to the oil layer area due to the difference in gravity between the oil and the water. In this way, the oil is put back to the oil layer area with simple operation and can be used repeatedly over and over.

Since the upper part of the opening overhangs its lower part, cleaning fluid and so on little comes into the oil storage tank in which the used oil is stored, while one is at cleaning work.

And having the opening without any cock at the upper position of the oil storage tank, this invention is effective in that number of components, assembling work thereof and factory expenses of the food fryer are respectively reduced, and in that the cleaning work next to the frying work in the food fryer is easy to be done.

BEST MODE OF EMBODIMENTS ACCORDING TO THE INVENTION (DESCRIPTION OF SPECIFIC EMBODIMENTS)

The invention is explained more in detail with reference to the attached figures from FIG. 1 to FIG. 6.

In these figures:

A is a food fryer having a cylindrical oil storage tank with circular sectional view;
B is a frying food tank of the food fryer A;
C is another food fryer having a cylindrical oil storage tank with ellipsoid sectional view;
D is a frying food tank of the food fryer C;
E is another food fryer for household use;
F is a frying food tank of the food fryer E;
G is the other food fryer having a rectangular parallelepiped oil storage tank;
H is a frying food tank of the food fryer G;
1 is an oil layer area;
2 is a water layer area;
3 is a heat source (heat pipe), 3' is an electric heater as a heat source;
4 is an air cooling tube;
5 is a cylindrical oil storage tank, 5a is an opening formed on the upper side wall of the oil storage tank, 5b is a lower end of the opening, 5c is an upper end (of the opening) extended to outer position than the lower end 5b to overhang it, 5d is a (lower) cock provided at the low end position of the oil storage tank;
6 is a rectangular parallelepiped oil storage tank, 6b is a lower end of the opening, 6c is an upper end (of the opening) extended to outer position than the lower end 6b to overhang it, 6d is a (lower) cock provided at the low end position of the oil storage tank;
10 is a bit of fried batter;
11 is a water discharge cock; and
12 is a net.

Any kind of energy may be used for the heat source 3 such as electricity, gas and so on.

Figure 1:
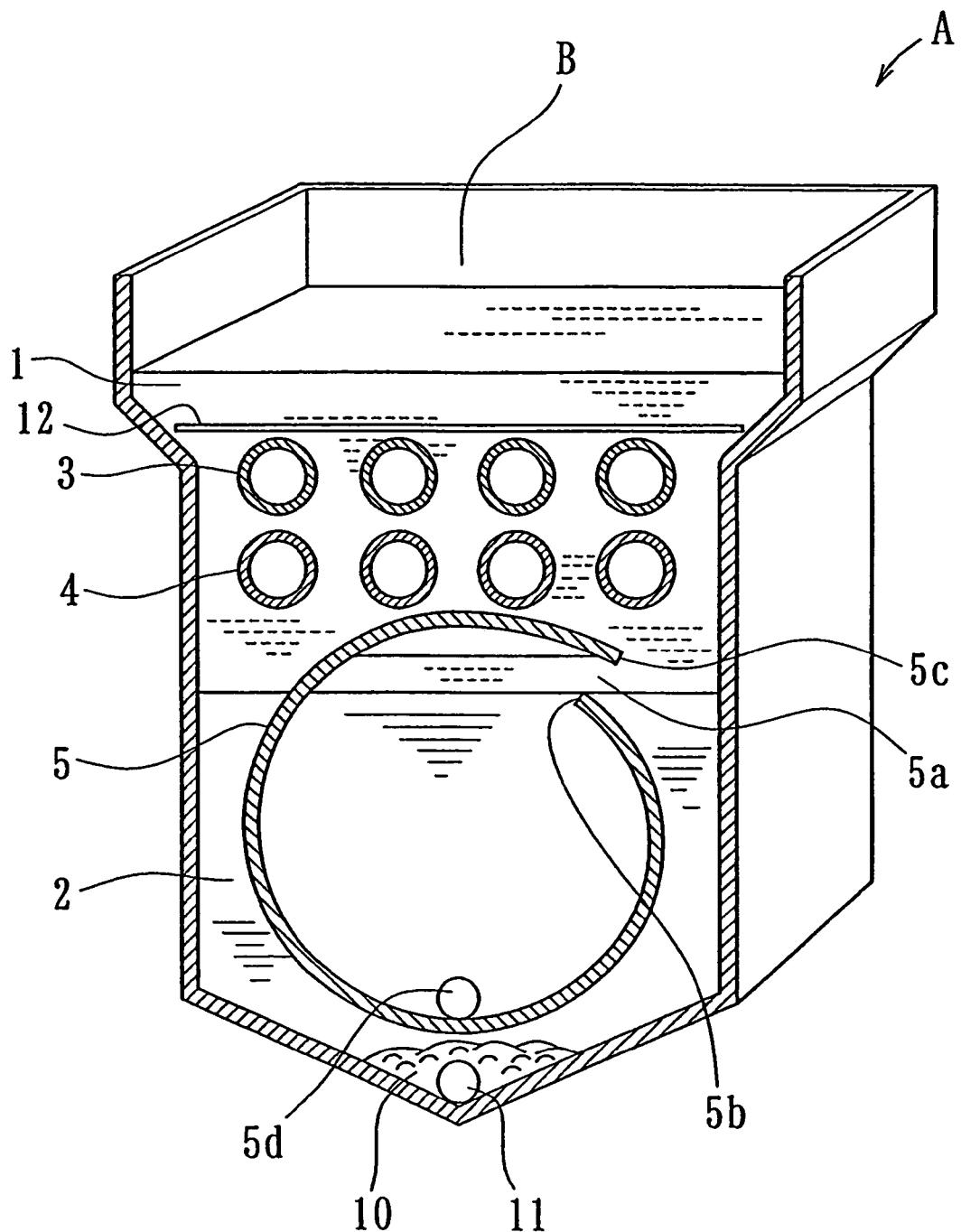
FIG. 1 shows a stage in usual frying operation of a food fryer having a cylindrical oil storage tank.

As shown in FIG. 1, the food fryer A has the cylindrical oil storage tank 5, where the opening 5a is formed at the upper side wall thereof so that oil in the oil layer area 1 moves through the opening 5a to be stored therein, if required.

The opening 5a is arranged around a boundary between the water layer area 2 and the oil layer area 1, and formed in a shape that the upper end 5c is extended outside of the oil storage tank 5 than the lower end 5b so as to cover this end 5b.

At ordinary use state, water is in lower part below the opening 5a and oil is in upper part above the opening 5a.

Procedure for storing the oil of the oil layer area 1 into the oil storage tank 5 after finishing food frying work is as follows:

First, by opening the cock 5d, one drains the water in the oil storage tank 5 out and pours the used oil in the oil layer area 1 into the oil storage tank 5 through the opening 5a; and Next, one closes the cock 5d at timing that the water in the oil storage tank 5 has been drained out and the oil in the oil layer area 1 has flowed into the oil storage tank 5.

Figure 2:
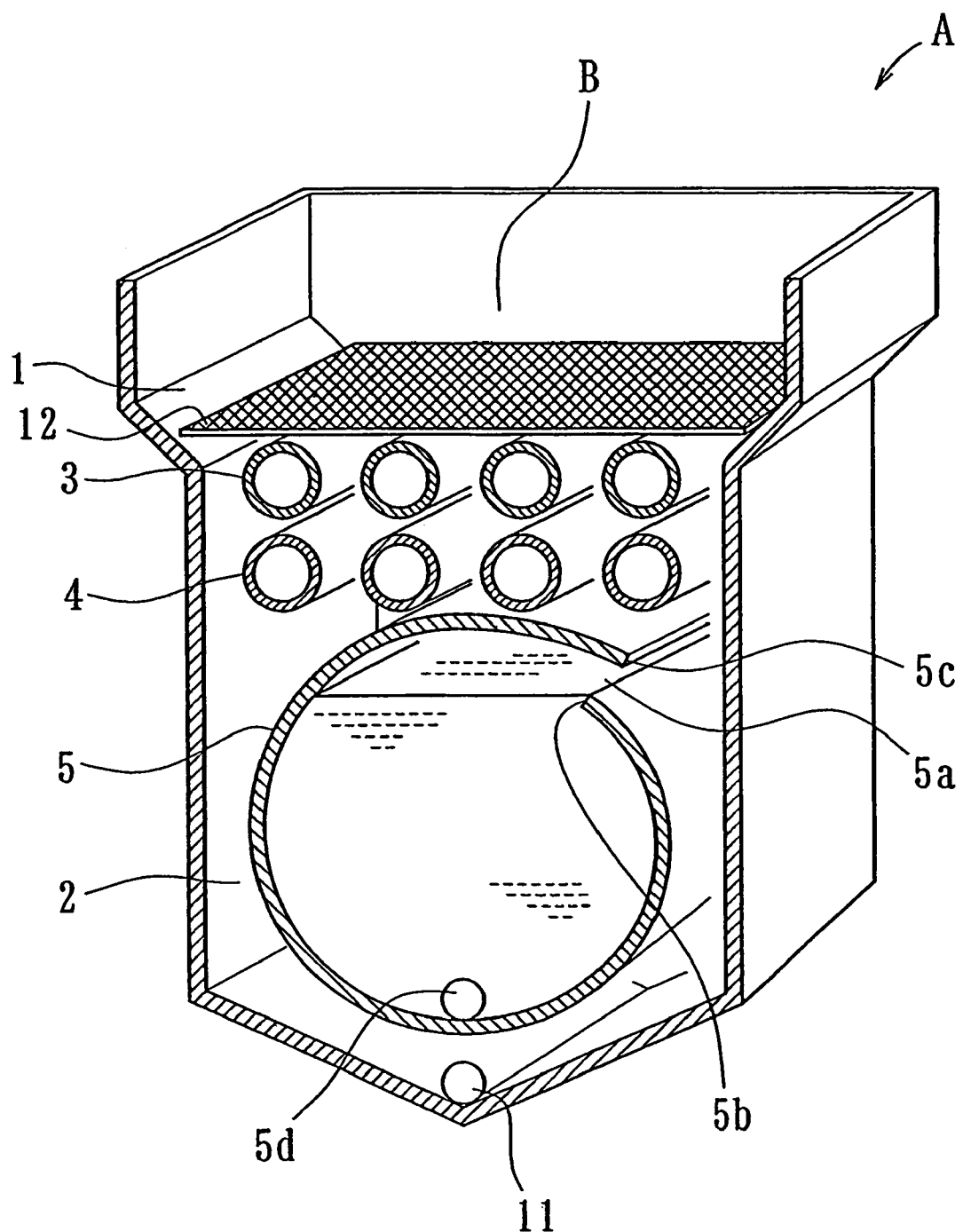
FIG. 2 shows a stage of cleaning preparation in which the oil storage tank is filled with used oil of FIG. 1.

As shown in FIG. 2, by opening the water discharge cock 11 next to the procedure of fully putting the oil into the oil storage tank 5, the water in the water layer area 2 is also drained out and the frying food tank B becomes empty as a result, except for the oil storage tank 5, and thereby cleaning work inside the frying food tank B may be proceeded under a safety condition.

As described above, the upper end 5c of the opening 5 is extended out of the opening 5a so as to over the lower end 5b and is formed at the side wall, not top wall, of the oil storage tank 5, and hence cleaning water and so on for the cleaning scarcely pours into the oil storage tank 5 during the cleaning work.

When the cleaning for the food frying tank B is finished and the water discharge cock 11 is again closed, merely pouring water into the frying food tank B allows the oil in the oil storage tank 5 to return to the oil layer area 1.

Figure 3:
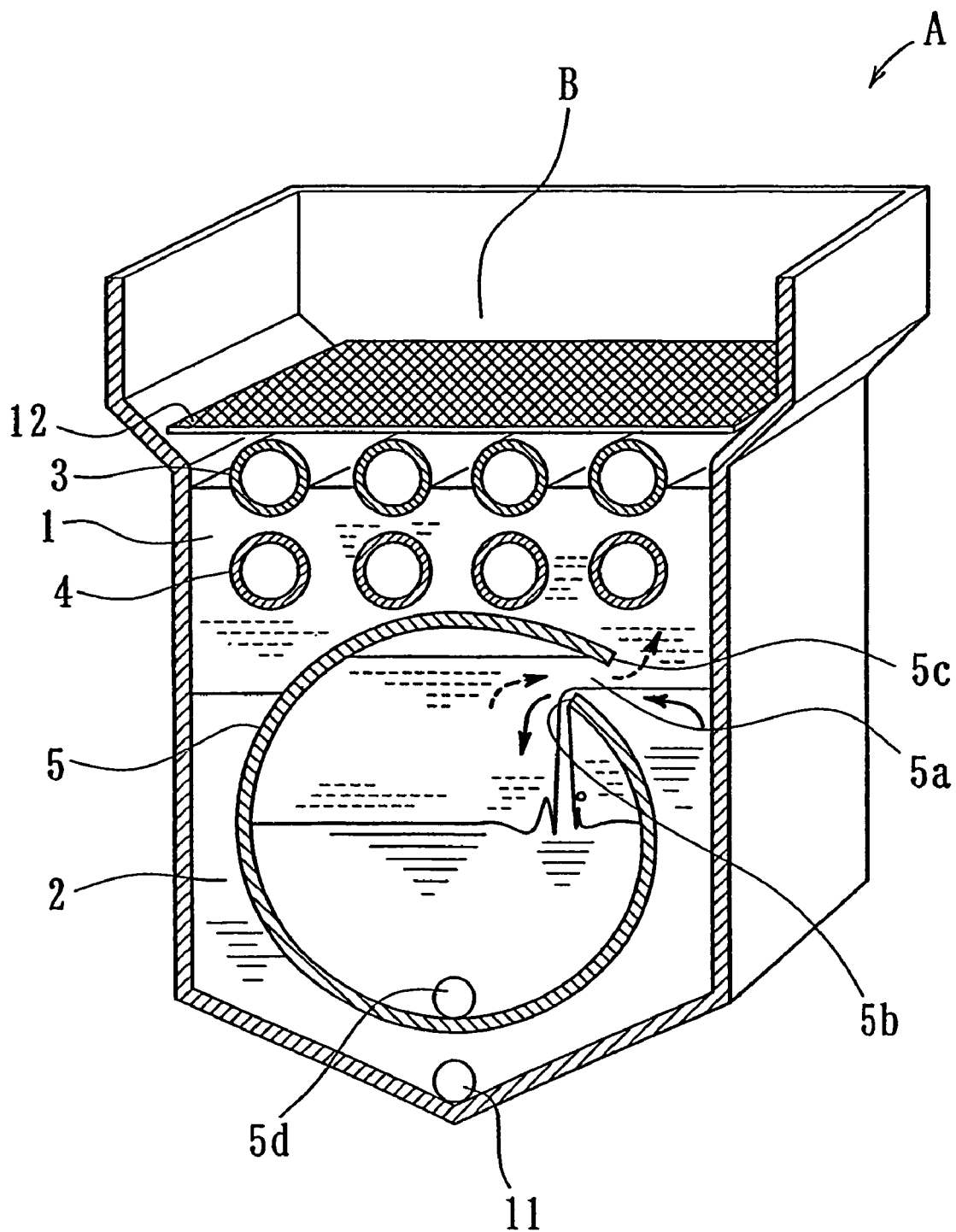
FIG. 3 shows a stage of putting water into the food fryer after cleaning out area of the oil storage tank of FIG. 1.

As shown in FIG. 3, when the water pouring goes on and the water eventually comes over the lower end 5b of the opening 5a, the water starts to flow into the oil storage tank 5, following which the oil stored in the oil storage tank 5 is to be moved up to the oil layer area 1 through the opening 5a due to the difference in specific gravity between oil and water.

Meanwhile, the oil in the oil storage tank 5 may be taken to outer space of the feed fryer by opening the cock 5d.

Figure 4:
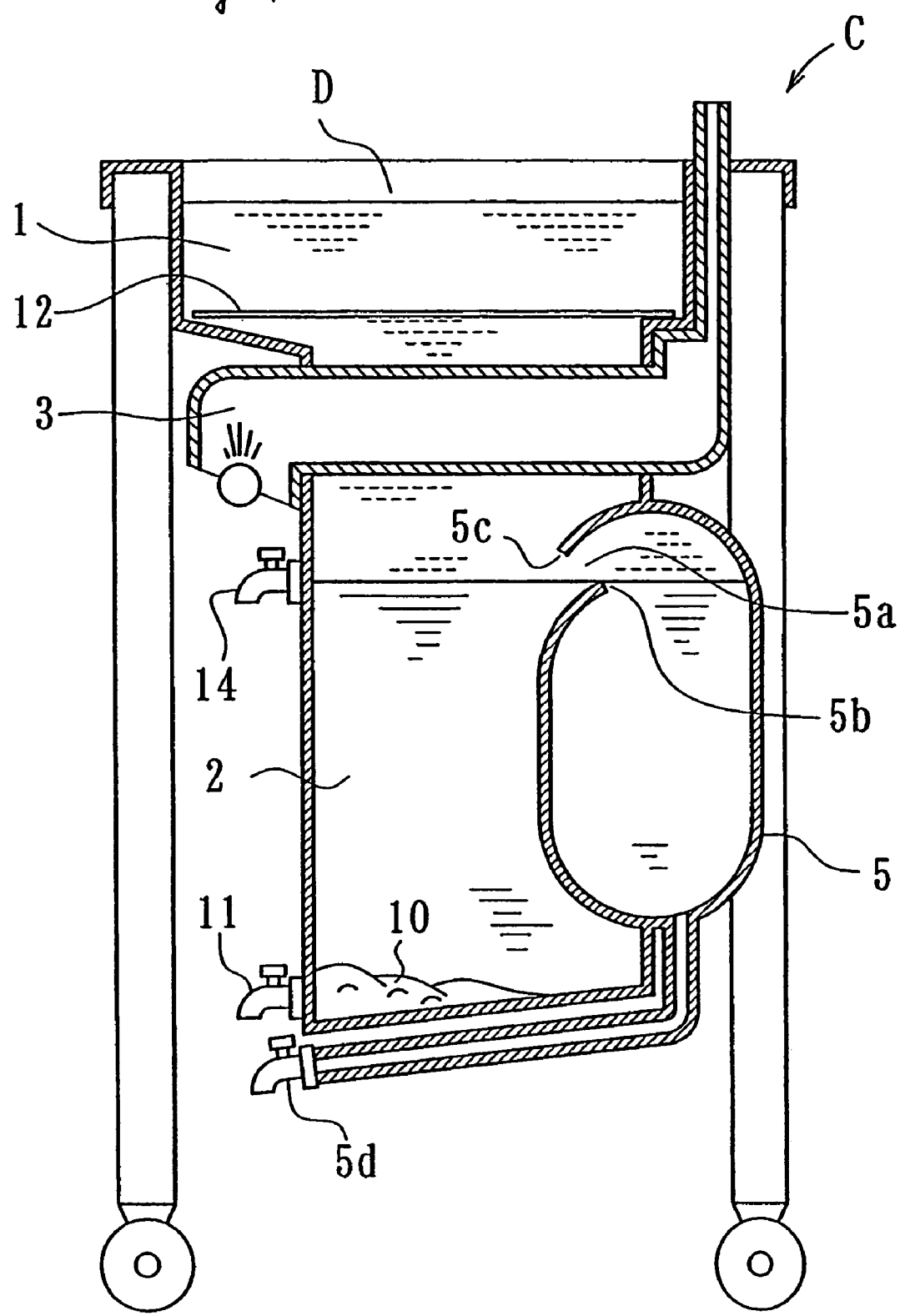
FIG. 4 shows a food fryer having a cylindrical oil storage tank other than that shown in FIG. 1.

In the food fryer C of FIG. 4, its oil storage tank 5 with ellipsoid section is outward presented with at back side of the frying food tank D, and no air cooling tube is presented with in the oil layer area 1.

Other basic composition of the food fryer C is the same as that of the food fryer A shown in FIG. 1.

Further to the above, since the oil storage tank 5 is provided in state of contacting with outside air at the wall of the food fryer C, it is easy to efficiently cool the oil storage tank 5 after storing the used oil therein, and hence the cleaning work for the frying food tank D is to be started in short time after the frying food tank D being emptied.

The oil in the oil layer area 1 may be also taken out by opening the oil discharge cock 14 in the state that the oil is not stored in the oil storage tank 5 as shown in FIG. 4.

Figure 5:
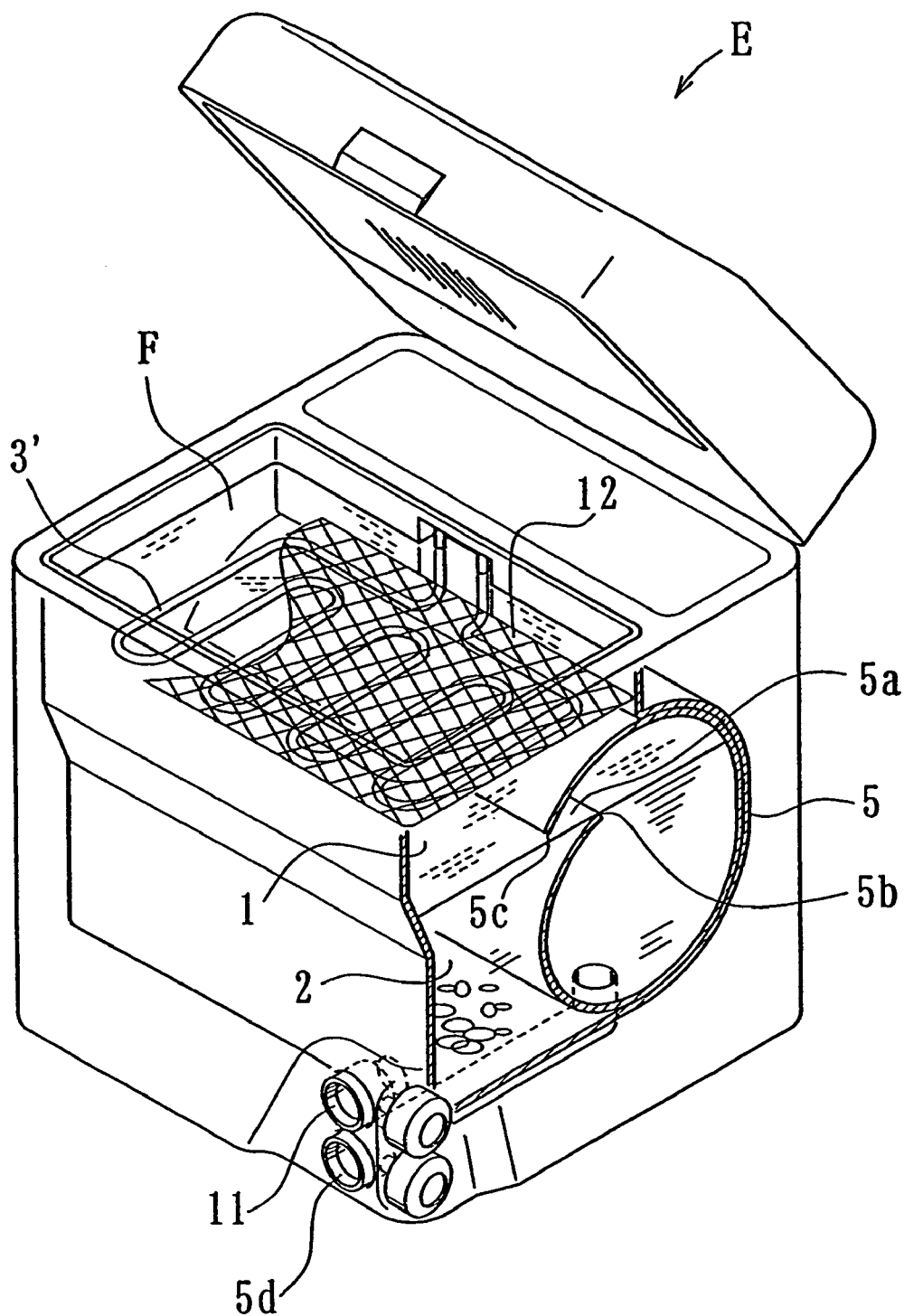
FIG. 5 shows a compact food fryer for household use.

The food fryer E of FIG. 5 is made in compact as a whole for household use, where electric heater 3' is used as heat source of oil and no air cooling tube in the oil layer area 1 is provided. Other basic composition of the food fryer C is the same as that of the food fryer A shown in FIG. 1.

The electric heater 3' is repeatedly arranged in a longitudinal direction of the frying food tank F in continuous state, by contrast, it may be repeatedly arranged in a lateral direction or other any direction.

Figure 6:
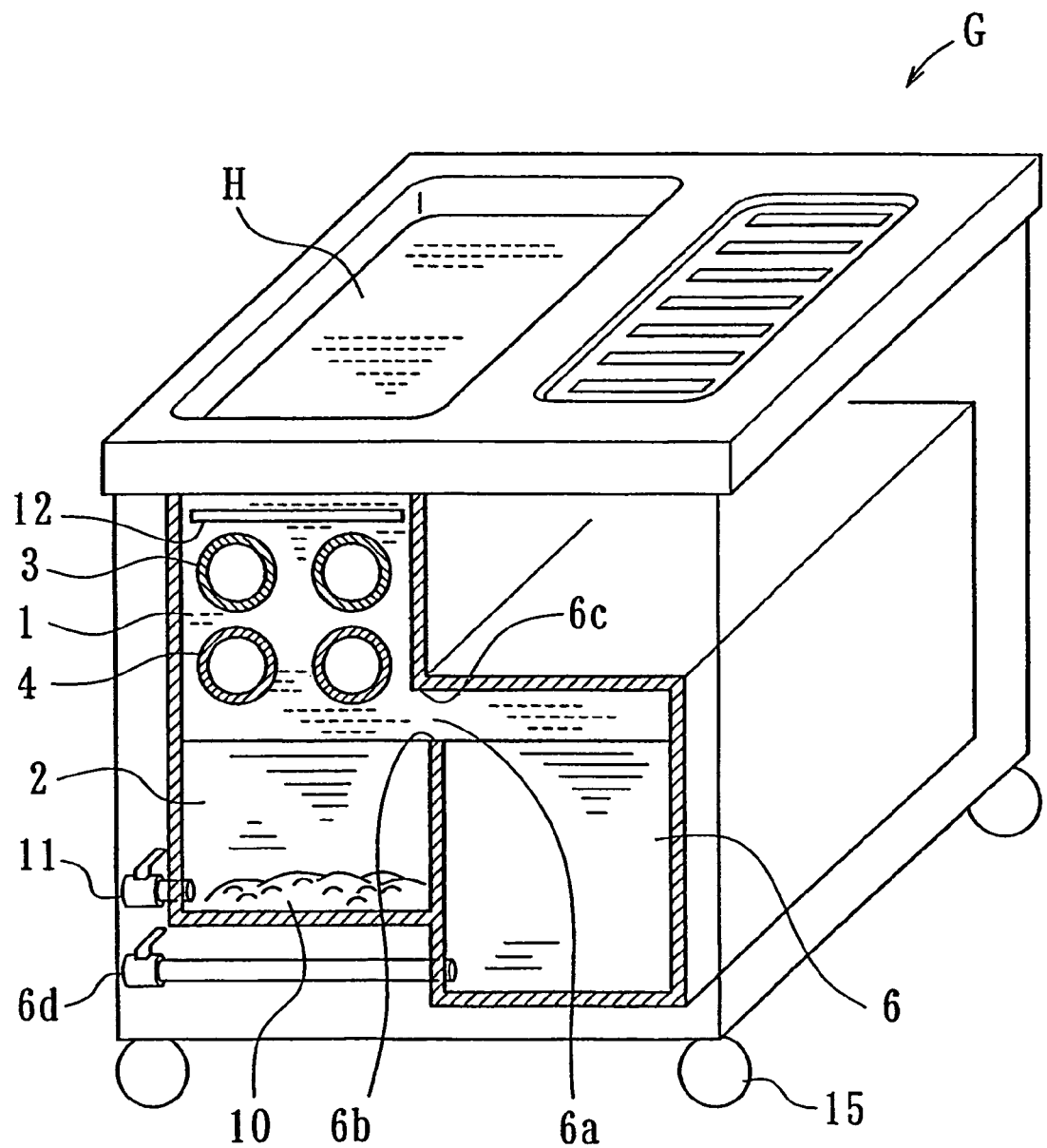
FIG. 6 shows another food fryer having a rectangular parallelepiped oil storage tank.
Figure 7:
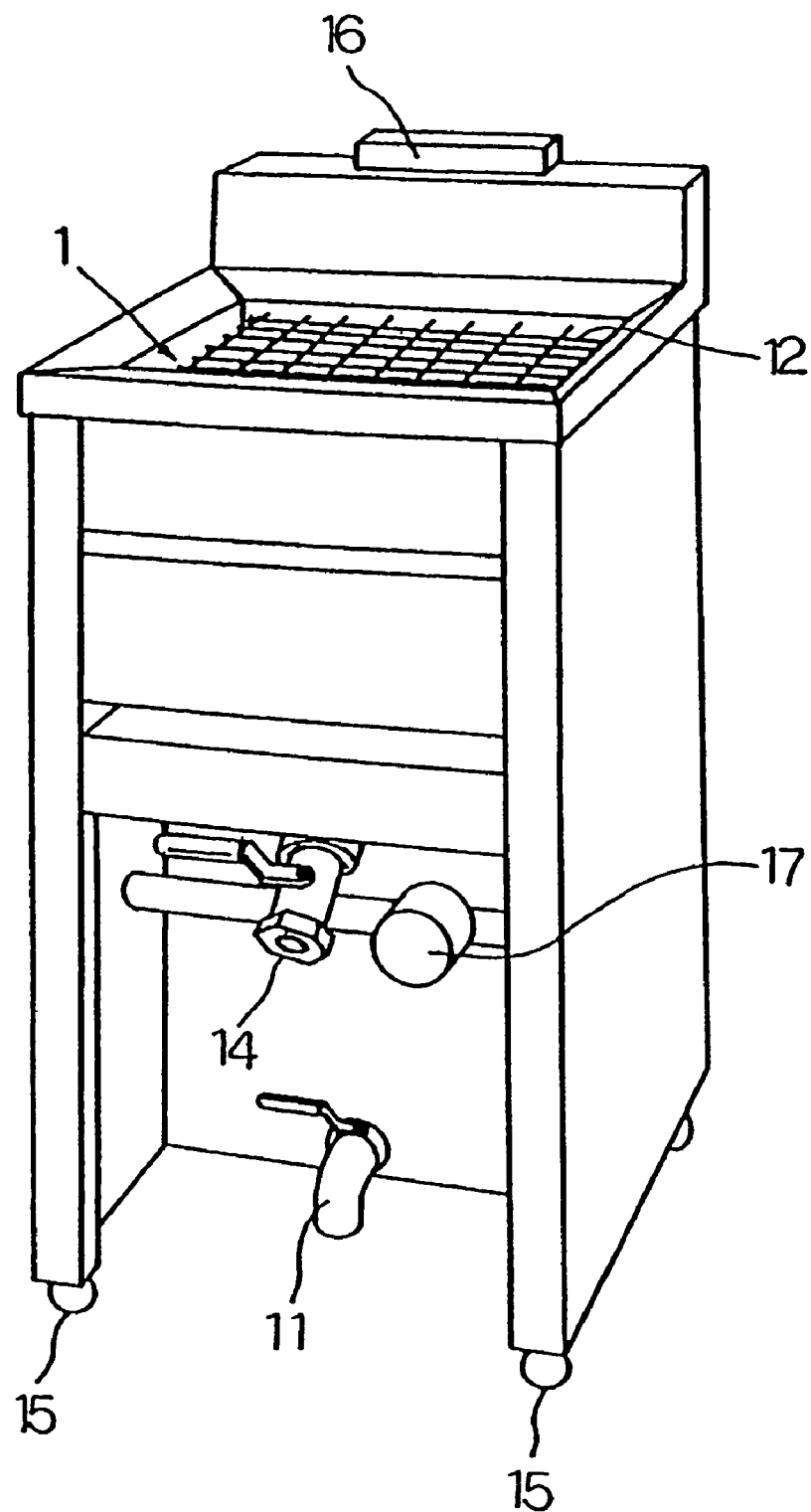
FIG. 7 shows an external view of the conventional food fryer.
Figure 8:
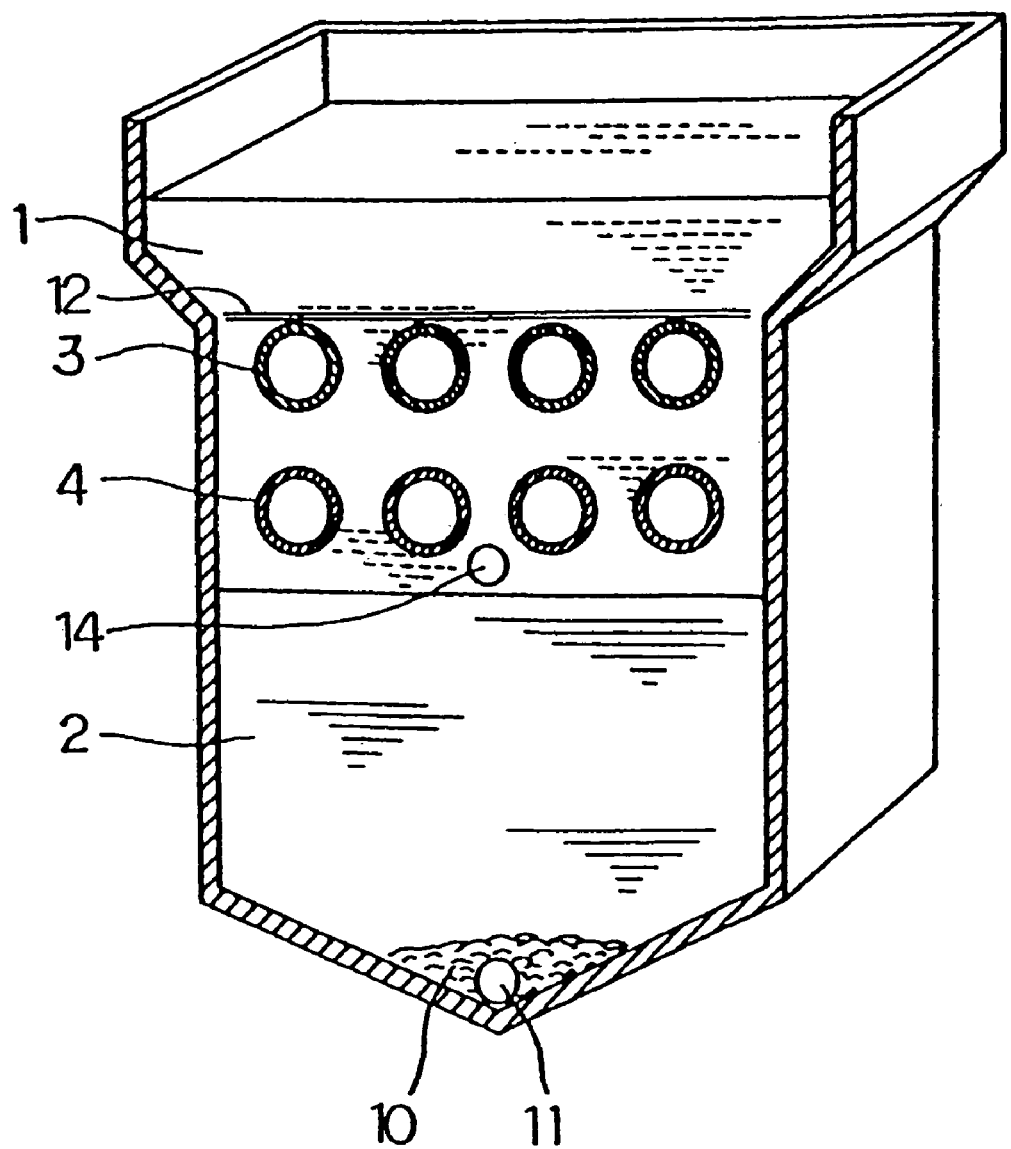
FIG. 8 shows a sectional view of the oil layer area and the water layer area in the conventional food fryer of FIG. 7.

The food fryer G of FIG. 6 comprises the rectangular parallelepiped oil storage tank 6, which is formed below and in parallel with the food frying tank H and is connected thereto through the opening 6a formed on upper side wall. The upper end 6c of the opening 6a extended out from the oil storage tank 6 so as to cover the lower end 6b thereof.

After food frying work, the food frying tank H is to be cleaned in the same way as in case of the food fryer A of FIG. 1:

First, by opening the cock 6d, one drains the water in the oil storage tank 6 out and pours the used oil in the oil layer area 1 into the oil storage tank 6 through the opening 6a;

Second, by closing the cock 6d at timing that the water in the oil storage tank 6 has been drained out and the oil in the oil layer area 1 has flowed into the oil storage tank 6, thereafter by opening the water discharge cock 11, one drains water in the water layer area 2 out; and Finally, one cleans empty space in the food frying tank H.

As described above, the upper end 6c of the opening 6 is extended out of the opening 6a so as to over the lower end 6b and is formed at the side wall of the oil storage tank 6, and hence cleaning water and so on for the cleaning scarcely pours into the oil storage tank 5 during the cleaning work.

When the cleaning for the food frying tank H is finished and the water discharge cock 11 is again closed, as above described, merely pouring water into this tank H allows the oil in the oil storage tank 6 to return to the oil layer area 1, which action is based on the difference in specific gravity between oil and water. And the food fryer G is consequently ready for next food frying work.

Meanwhile, oil in the oil storage tank 6 may be taken to outer space by opening the cock 6d.

Water inlet opening of each the food fryer A, C, E and G is not shown in figures but may be formed at any place of the oil layer area 1. The air cooling tube 4 may be eliminated in also the food fryer A and G.

Each of the food fryers A, C, E and G has no cock for opening and closing the opening 5a, 6a, the production cost is reduced and the cleaning work may be simply easy to be done.

INDUSTRIAL APPLICABILITY

As above described, the food fryer according to the invention is intended to give safety and efficiency in the cleaning work thereof and to reduce product cost, food fryer which is good for both business use and household use.

The invention claimed is:

1. A food fryer having a frying food tank of a water layer area and an oil layer area therein, comprising:
   an oil heating means in the oil layer area;
   an oil storage tank formed below the oil heating means, having a cock at lower position of the storage tank, and a side, transversal opening at a upper side part of the oil storage tank with a lower lip and an upper lip that overhangs said lower lip; and
   wherein water in the oil storage tank is drained out through the cock and oil in the oil layer area flows into the oil storage tank through the opening when the cock is opened.

2. A food fryer claimed in claim 1 wherein a water discharge cock is provided at the low end of the water layer area.

3. A food fryer of claim 1, wherein:
   said oil storage tank is in a side position and shares a sidewall with said frying food tank, and said side, transversal opening is in said shared side wall.

4. A food fryer of claim 1 wherein:
   said oil storage tank is in a shape of an open tubular column horizontally positioned in said frying food tank, with its one edge as the upper lip of the opening overhanging its other edge as the lower lip of the opening.

* * * * *